United States Patent [19]

Marra

[11] Patent Number: 4,784,012
[45] Date of Patent: Nov. 15, 1988

[54] ROTOR BALANCE SYSTEM

[75] Inventor: John J. Marra, Palm Beach Gardens, Fla.

[73] Assignee: United Technologies Corporation, Hartford, Conn.

[21] Appl. No.: 94,214

[22] Filed: Sep. 8, 1987

[51] Int. Cl.⁴ .................... F16F 15/22; F01D 5/10
[52] U.S. Cl. .................... 74/573 R; 74/574; 415/119
[58] Field of Search ............ 74/573 R, 572, 574; 415/119, 500, 219 C, 219 R, 219 A, 219 B

[56] References Cited

U.S. PATENT DOCUMENTS

| | | | |
|---|---|---|---|
| 3,282,127 | 11/1966 | Deakin | 74/573 R |
| 3,366,202 | 1/1968 | James | 74/573 R X |
| 3,368,654 | 2/1968 | Wegh et al. | 74/573 R |
| 3,494,471 | 2/1970 | Grippo | 74/573 R X |
| 3,610,069 | 10/1971 | Tanner | 74/573 R |
| 3,916,495 | 11/1975 | Klassen et al. | 74/573 R |
| 4,059,972 | 12/1977 | Beam et al. | 74/573 R |
| 4,192,633 | 3/1980 | Herzner | 419/119 |
| 4,220,055 | 9/1980 | Dubois et al. | 74/573 |
| 4,294,135 | 10/1981 | Tameo | 74/573 |
| 4,539,864 | 9/1985 | Wiebe | 74/573 R |
| 4,667,532 | 5/1987 | Holz et al. | 74/573 R |

FOREIGN PATENT DOCUMENTS

| | | | |
|---|---|---|---|
| 621061 | 5/1961 | Canada | 74/573 R |
| 1473687 | 1/1969 | Fed. Rep. of Germany | 73/573 R |
| 0153956 | 11/1981 | Japan | 74/573 R |
| 624130 | 8/1978 | U.S.S.R. | 74/573 R |
| 805371 | 12/1958 | United Kingdom | 74/573 R |

Primary Examiner—Gary L. Smith
Assistant Examiner—Vinh Luong
Attorney, Agent, or Firm—Edward L. Kochey, Jr.

[57] ABSTRACT

A balance ring (18) which is shrunk fit within each disk (12) of a rotor is selectively ground for detail balance. A plurality of openings (20) through the outer edge of the balance ring receive weights during the assembly balance of the rotor. A snap ring (44) retains the weights within the openings. An eccentric inwardly extending raised area (26) throughout a substantial minority of the circumference provides for initial gross unbalance correction upon installation.

5 Claims, 2 Drawing Sheets

U.S. Patent  Nov. 15, 1988  Sheet 1 of 2  4,784,012

ROTOR BALANCE SYSTEM

The Government has rights in this invention pursuant to a contract awarded by the Department of the Air Force.

BACKGROUND OF THE INVENTION

The invention relates to the balancing of integrally bladed rotors and in particular to the balancing of multi-disk rotors.

Bladed rotors such as compressors and turbines of gas turbine engines rotate at a high rate of speed. Dynamic unbalance of such rotors leads to severe vibration reducing the useful life of the component.

It is accordingly known to add or remove material at selected locations to achieve proper balance. Some schemes require machining operations on the disk itself, producing stress concentrations therein to the detriment of the rotor. Some require removal of the disks from the balancing machine for machining with later remounting on the balancing machine. This not only increases the labor involved but variations caused by remounting of the disk make the ultimate balancing difficult.

Copending application Ser. No. 94,213, entitled Rotor Balance System, filed on Sept. 8, 1987 by Novotny, describes a rotor balance system wherein a balance ring is shrunk fit within a bladed disk. Detail balancing of this subassembly is carried out by grinding only on the balance ring. This provides a lightweight ring with sufficient material to normally permit balancing of a disk. Integrally bladed disks, however, tend to have relatively high levels of initial unbalance. This unbalance can exceed or at least strain the balance capability of the described balance scheme. An approach to overcome the gross inital unbalance is therefore desirable.

SUMMARY OF THE INVENTION

An integrally bladed rotor disk is spun without a balance ring installed to determine the initial unbalance of the ring. An eccentrically weighted balance ring is thereafter shrunk fit into the disk in a manner to cancel the initial unbalance. The eccentric weight of the balance ring includes inwardly extending excess material which extends through an arc of approximately 120 degrees. This weight extends through a substantial minority of the circumference because installation of the balance ring itself causes some distortion to the disk whereby the initial unbalance location will tend to shift. On the other hand, the weight should not exceed that required for such variations since this would unnecessarily increase the weight of the assembly.

The disk with the balance ring installed is then spun to determine the residual unbalance. The residual unbalance is corrected by hand grinding only on the balance ring.

After the disks are assembled to form a complete rotor, final balancing is carried out by installation of weights at appropriate locations.

DESCRIPTION OF THE PREFERRED EMBODIMENT

Figure 1:
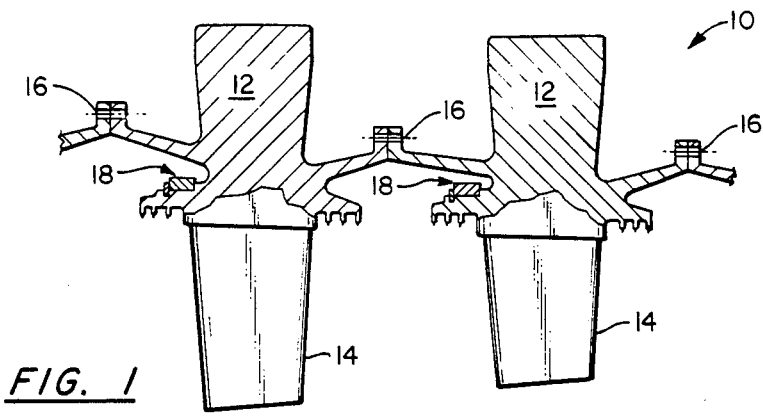
FIG. 1 is an arrangement of several disks to form a rotor.
Figure 2:
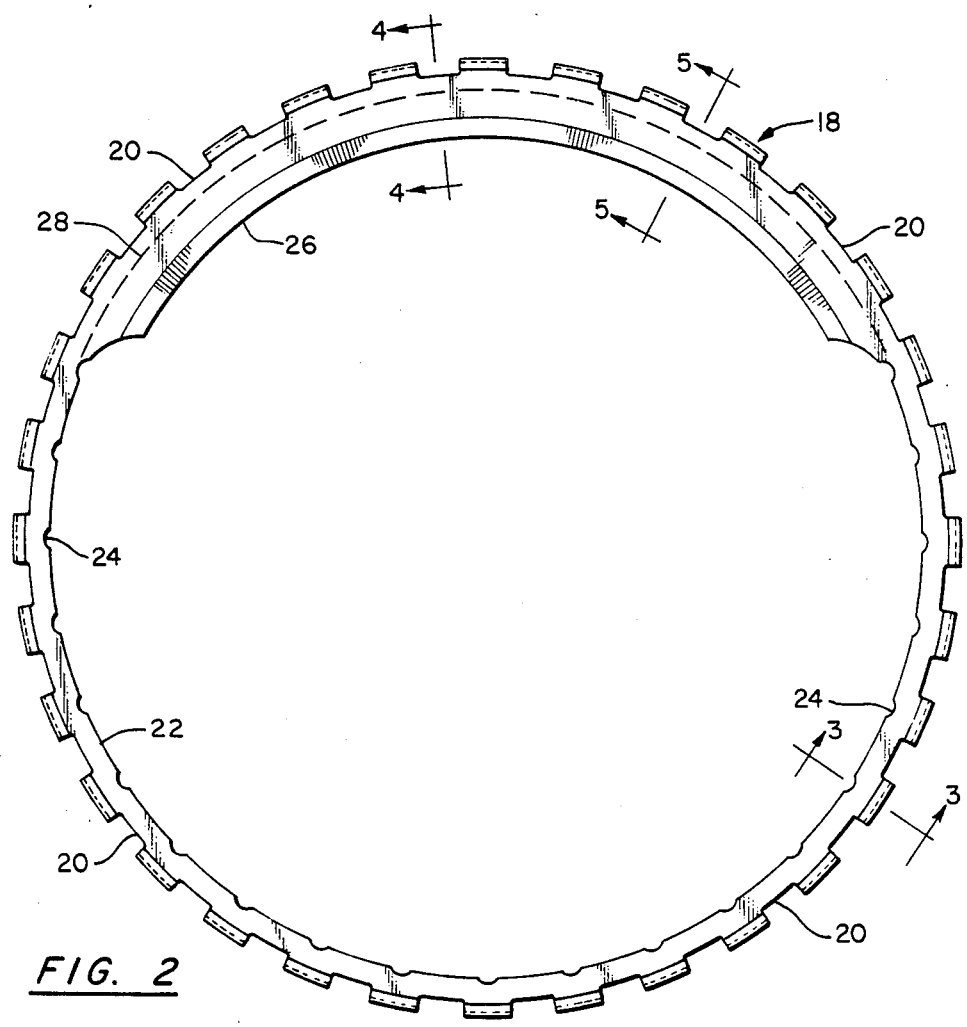
FIG. 2 is a view of the balance ring.

A rotor 10 of a gas turbine engine includes a plurality of disks 12 each carrying a plurality of blades 14. Each disk is bolted 16 to an adjacent disk thereby forming a rotor assembly. A balance ring 18 is shrink fit internally of each disk.

The balance ring 18 contains a plurality of openings 20 at the outer edge. The ring has an inwardly extending portion 22 around a major portion of the circumference with scallops 24 located at the inner surface between the external openings 20. The ring has an outside diameter of 5.13 inches and an overall thickness of about 0.3 inches. Scallops 24 are of a depth of 0.04 inches, this being selected so that the remaining material is sufficient to avoid buckling of the balance ring 18 when it is shrink fit within the disk 12. Such shrink fit is accomplished by heating the disk and cooling the balance ring so as to achieve an interference fit of 0.003 inches on the diameter of 5.13 inches.

An eccentric inwardly extending raised area 26 extends throughout a substantial minority of the circumference of the balance ring 18 in the order of 120 degrees. Dashed line 28 indicates the limit of later material removal, consistent with the limit set by the scallops 24.

Figure 3:
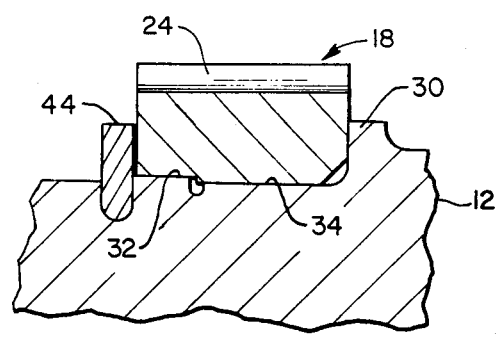
FIG. 3 is a view through section 3—3 of FIG. 2 showing the balance ring as installed in the area of the internal scallops.
Figure 4:
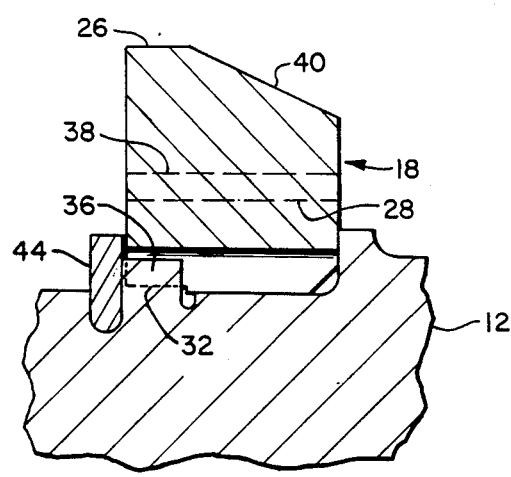
FIG. 4 is a view through section 4—4 of FIG. 2 as showing the raised area of balance ring as installed in the area of the anti-rotation locks.

FIG. 3 is a section through the substantially uniform thickness where it can be seen as shown in FIG. 4 the disk has several local internal protrusions 36 with these protrusions being limited to the location of lip 32. This provides insurance against rotation of the balance ring within the disk 12.

FIG. 4 is a section through the eccentric raised portion of the ring showing the inwardly extending raised portion 26 of the ring. Dashed line 38 indicates the location of the inside diameter of the remainder of the ring, and dashed line 28 indicates the limit of future material removal. The taper 40 on the inside diameter of the ring provides sufficient clearance from the disk to preclude nicking the disk while grinding the balance ring.

In order to balance a turbine rotor each single integrally bladed disk is spun at about 900 RPM and the location of the unbalance determined. The eccentrically weighted balance ring 18 is then shrunk fit within the disk with the eccentric weight or raised portion 26 being located to compensate for the initial unbalance.

The disk with the ring installed is then spun at about 900 RPM with the location and amount of unbalance determined. In order to correct the unbalance, material is hand ground from the inwardly extending portion 22 or the raised portion 26 as required. When grinding the inwardly extending portion 22 such grinding should not exceed the depth of scallops 24 which serve as guides for minimum thickness of the ring. Grinding in the area of the raised area 26 should not extend between line 28 which is essentially the same depth as the scallops 24.

The use of a balance ring with a highly concentrated eccentric weight would not be satisfactory. Installation of the balance ring as a shrink fit will result in some distortion of the bladed disk and accordingly shift the unbalance from its initial location. The eccentric weight of the balance ring should therefore be of a rather broad band between 90 degrees and 135 degrees, with the arc of 120 degrees recommended. Increasing the band of the raised area beyond this range increases the weight of the structure with no resulting benefit.

After the detail balance of each disk, the plurality of disks is assembled to form a rotor. This rotor is then rotated on a balancing machine to determine the out of balance. Balance weights 42 are placed within openings 20 as required to correct the unbalance of the final assembly.

Figure 5:
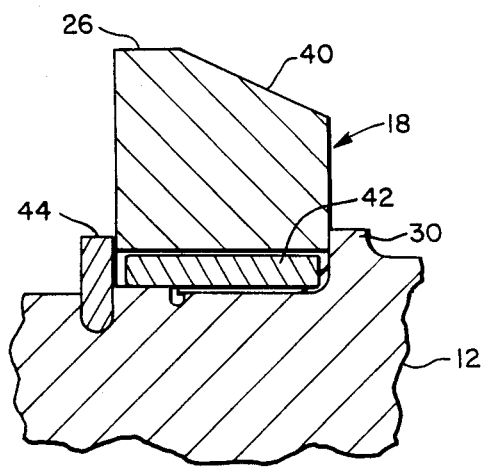
FIG. 5 is a view through section 5—5 of FIG. 2 showing the raised area of the balance ring as installed showing an area of the external openings and an installed weight.

As shown in FIG. 5, the weight 42 is retained in one direction by lip 30 on the disk. Snap ring 44 fits within the disks on a second side of the balance ring with a snap ring retaining the weights 42 within the openings.

The detailed balance involves the shrink fit of the balance ring within the disk and is therefore a permanent arrangement which cannot be removed during later maintenance operations. The assembly balance on the other hand may be corrected as required during later maintenance by removing the snap ring and changing the weights.

I claim:

1. A rotor balance system for an integrally bladed gas turbine engine rotor comprising:
   a plurality of disks, each carrying a plurality of integral blades;
   a single balance ring internally shrink fit to each disk;
   an eccentric raised area throughout a substantial minority of the circumference of each balance ring, said balance ring being substantially uniform throughout the remainder of the circumference;
   said balance ring selectively ground to establish a detail balanced condition of each disk;
   a plurality of openings through the outer edge of each balance ring;
   a plurality of balance weights within said openings for establishing a balanced condition of the assembled plurality of disks; and
   a snap ring internal of each disk adjacent to said balance ring for retaining said balance weights within said openings.

2. A rotor balance system as in claim 1:
   said eccentric raised area extending between 90 and 135 degrees of the circumference of said balance ring.

3. A rotor balance system as in claim 1:
   said eccentric raised area inwardly extending.

4. A rotor balance system as in claim 2:
   said eccentric raised area inwardly extending.

5. A rotor balance system as in claim 2:
   said eccentric raised area extending substantially 120 degrees of the circumference of said balance ring.

* * * * *